US007244915B2

(12) United States Patent
Wright

(10) Patent No.: US 7,244,915 B2
(45) Date of Patent: Jul. 17, 2007

(54) MICROWAVABLE FLEXIBLE SHEETS FOR DRAPING OVER FOOD DURING MICROWAVE HEATING

(76) Inventor: David L. Wright, 4041 NW. 199th St., Miami, FL (US) 33055

( * ) Notice: Subject to any disclaimer, the term of this patent is extended or adjusted under 35 U.S.C. 154(b) by 0 days.

(21) Appl. No.: 10/989,932

(22) Filed: Nov. 16, 2004

(65) Prior Publication Data

US 2005/0133501 A1    Jun. 23, 2005

Related U.S. Application Data

(60) Provisional application No. 60/532,208, filed on Dec. 22, 2003.

(51) Int. Cl.
*H05B 6/80* (2006.01)
*B65D 65/02* (2006.01)
(52) U.S. Cl. .................... 219/734; 219/735; 219/762; 99/DIG. 14; 426/234; 426/241
(58) Field of Classification Search ........ 219/734–735, 219/762; 426/107, 118, 241, 234; 99/DIG. 14; 150/154, 165
See application file for complete search history.

(56) References Cited

U.S. PATENT DOCUMENTS 4,037,581 A    7/1977  Trifiletti 4,117,825 A    10/1978  Robertson (Continued)

FOREIGN PATENT DOCUMENTS

CA    2 381 435    10/2003

(Continued)

*Primary Examiner*—Philip H. Leung
(74) *Attorney, Agent, or Firm*—Williamson Intellectual Property Law, LLC; Thomas R. Williamson, III

(57) ABSTRACT

A device for covering food (306) during microwave heating includes a microwavable flexible sheet (100) having a substantially smooth, food-facing surface (102) that is free of openings. The sheet (100) has a configuration including size, shape, and weight distribution for flexibly draping the sheet (100) over the food (306) on a rigid structure (304) such that the flexibly draped sheet (100) overhangs and folds loosely over an outer perimeter of the rigid structure thereby forming at least a partial enclosure around the food (306) when the sheet contacts at least a portion of an outer perimeter of the food-containing rigid structure (304). During microwave heating, the at least a partial enclosure around the food (306) substantially contains food-splattering (308) inside while allowing steam (312) to escape through an opening (310) formed between the flexibly draped sheet (100) and the outer perimeter of the rigid structure (304).

13 Claims, 3 Drawing Sheets

U.S. PATENT DOCUMENTS

| | | | |
|---|---|---|---|
| 4,343,978 A | 8/1982 | Kubiatowicz | |
| 4,345,133 A | 8/1982 | Cherney et al. | |
| 4,481,392 A | 11/1984 | Nibbe et al. | |
| 4,560,850 A * | 12/1985 | Levendusky et al. | 219/731 |
| D292,366 S | 10/1987 | Kuether et al. | |
| 4,721,140 A * | 1/1988 | Coker | 150/154 |
| 4,748,308 A | 5/1988 | Drews | |
| 4,801,773 A | 1/1989 | Hanlon | |
| 4,841,112 A * | 6/1989 | Peleg | 219/730 |
| 4,925,684 A * | 5/1990 | Simon | 426/107 |
| 5,039,001 A * | 8/1991 | Kinigakis et al. | 229/120 |
| 5,126,520 A | 6/1992 | Nottingham et al. | |
| 5,436,434 A | 7/1995 | Baird | |
| 6,093,920 A * | 7/2000 | Beckwith | 219/734 |
| 6,325,234 B1 | 12/2001 | Legaspi | |
| 6,734,407 B1 | 5/2004 | Abbott | |
| 2003/0205575 A1 | 11/2003 | DeWinter | |

FOREIGN PATENT DOCUMENTS

| | | |
|---|---|---|
| WO | WO 00/69222 | 11/2000 |

* cited by examiner

MICROWAVABLE FLEXIBLE SHEETS FOR DRAPING OVER FOOD DURING MICROWAVE HEATING

CROSS-REFERENCE TO RELATED APPLICATION

This application is based upon and claims priority from prior Provisional Patent Application No. 60/532,208, filed on Dec. 22, 2003, the entire disclosure of which is herein incorporated by reference.

FIELD OF THE INVENTION

The present invention generally relates to the field of dish and food covers, and more particularly relates to a device for covering dishes and food during microwave cooking.

BACKGROUND OF THE INVENTION

When food is heated in a microwave, water molecules within the food become excited resulting in a build up of pressure. This pressure escapes from the food in the form of steam. Frequently, the release of steam is sudden, like an eruption, which causes food to splatter. Therefore, whenever food is heated in a microwave, it should be covered with a microwave transparent material to prevent splattering food particles from soiling the interior of the microwave.

U.S. Pat. No. 4,801,773 to Hanlon discloses a protective cover for a dish being heated in a microwave oven. The cover is formed of moisture-absorbent, microwave transparent material forming a top member and an encircling wall member depending downwardly form the periphery of the top member to completely cover the dish to protect the interior of the oven from any possible spattering of food particles during the heating. The cover is formed of absorbent material so that any escaping fluids and food particles may be captured or absorbed by the cover. The wall member is fluted to give the cover self-supporting rigidity, and an upper edge of each fluted portion coincides with a scalloped portion of the top member. The cover may be treated with a microwave safe resin to increase the rigidity of the cover.

U.S. Patent Publication No. 20030205575 discloses a device for preventing food splatter during microwave cooking which includes a sheet of material capable of maintaining a crease, and which has at least one crease that extends across the sheet. The device is positioned over food disposed on an open dish with the crease extending across the dish and with the crease being at an apex of the sheet while the food is heated in a microwave oven. The invention provides a convenient, easy to use and inexpensive device and method for preventing food splatter during microwave cooking of food in an open container such as a plate or bowl.

U.S. Pat. No. 5,126,520 to Nottingham et al discloses a shielded cover for a microwave container having upper and lower layers and a diamond-shaped metallic ring therebetween. The ring surrounds an upwardly extending multi-step truncated pyramid formed out of the center section of the upper and lower layers of the cover. The top surface of the truncated pyramid includes a series of openings to vent steam produced within the container. Microwave radiation produced by the microwave oven is reflected by the metallic ring and therefore only penetrates the cover to enter or exit the container at the corners and the center section of the cover. Microwaves are concentrated at the center section of the container and retained within the container, heating the center of the food therein proportionally more than the outer portion of the food, resulting in food having a uniform and consistent temperature throughout.

U.S. Pat. No. 4,748,303 to Drews discloses a microwave toaster including a rectangular block of microwave transparent material having a plurality of parallel and aligned slots therein for receiving cards of material which absorb microwave energy and subsequently dissipates heat therefrom. A piece of bread is positioned next to the material to absorb the heat dissipated therefrom for subsequently turning into browned toast.

Finally, WO 00/69222 to Davis discloses a fabric composite for microwave cooking. A composite of textile materials enhances both insulation and ventilation when formed as an enclosure or a cover for articles, and has particular utility for microwave cooking. The fabric composite includes multiple layers. One layer is a top insulative layer which has a multiplicity of pores therein, which may be voids which are present in a woven textile material. A mesh layer is attached to the insulative layer. The mesh layer has a multiplicity of pores which are formed therein. The mesh layer is formed of a non-porous fiber. One layer provides insulation to hold heat within the container or another article, while the mesh layer retards splattering. The composite allows steam ventilation from the container without the requirement of lifting a corner of the cover or enclosure from the container, or otherwise taking steps to provide ventilation. The fabric composite is machine washable.

Existing food covers do not provide consumers or users with a sanitary, easy-to-use product for microwave cooking. Many existing covers have a porous, mesh, or non-smooth surface facing the food which becomes contaminated with splattered food. If not properly and thoroughly cleaned, these non-smooth surfaces become havens for bacteria and germs. Also, many existing covers absorb liquid or moisture from steam which also creates an unsanitary condition as well as making the cover messy to handle. Furthermore, some existing covers are rigid and bulky making them difficult to wash in a dishwasher and inconvenient for storage.

Accordingly, there exists a need for overcoming the disadvantages of the prior art as discussed above.

SUMMARY OF THE INVENTION

According to an embodiment of the present invention, a device for covering food during microwave heating includes a microwavable flexible sheet having a substantially smooth, food-facing surface that is free of openings. The microwave sheet has a configuration and weight distribution for draping the sheet over food on a food-containing rigid structure such that the sheet contacts a portion of an outer perimeter of the food-containing rigid structure creating a partial enclosure around the food. During microwave heating, the partial enclosure around the food substantially contains food-splattering inside while allowing build-up of steam to escape through an opening between the sheet and the portion of the outer perimeter of the food-containing rigid structure.

In an exemplary embodiment, the microwave sheet is made of plastic material, such as polyethylene. The microwave sheet has a gauge in the range of about 1 mil to approximately 12 mil.

Further, according to another embodiment of the present invention, a device for covering food during microwave heating includes a microwavable flexible sheet having a substantially smooth, food-facing surface that is free of openings. The microwave sheet has a configuration and weight distribution for draping the sheet over food on a plate such that the sheet contacts an edge of the plate creating a cover over the food. During microwave heating, the cover substantially contains food-splattering while allowing build-up of steam to escape through an opening between the sheet and the edge of the plate.

In an exemplary embodiment, the microwave sheet has a perimeter portion. Optionally, the perimeter portion includes a fold or bevel. Also, optionally, the gauge or weight of the perimeter portion of the sheet is greater than a gauge or weight of an interior portion of the sheet. Alternatively, the perimeter portion includes microwaveable weights.

Moreover, according to another embodiment of the present invention, an apparatus for heating food in a microwave includes a microwavable container for containing food and a microwavable steam-impermeable sheet having a configuration and weight for draping the sheet over the microwavable container to form a cover over the food. During microwave heating, the cover substantially contains food-splattering while allowing build-up of steam to escape through an opening between the sheet and the container.

In an exemplary embodiment, the microwave sheet includes attachment means for connecting the sheet to a food container. Optionally, the sheet is removably attached to the container. Alternatively, the microwave sheet is rotationally attached to the food container.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention

DETAILED DESCRIPTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

Figure 1:
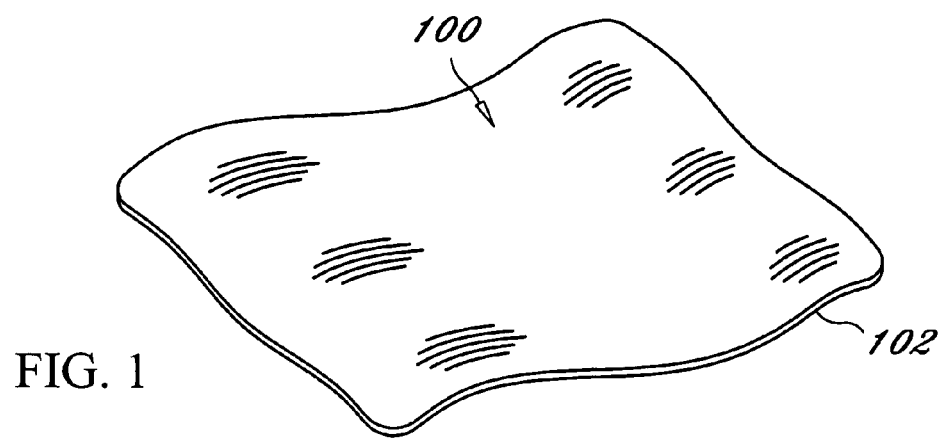
FIG. 1 is a perspective view showing a microwave sheet according to an embodiment of the present invention.

According to an embodiment of the present invention, as shown in FIG. 1, a microwave sheet 100 is flexible single sheet of microwaveable material. The microwave sheet 100 includes at least one substantially smooth, food-facing surface 102 which is free of openings. The sheet 100 has a configuration and sufficient weight to be draped over food and/or over a food-containing structure to create at least a partial enclosure around the food.

When placing the microwave sheet 100 over a dish, the substantially smooth surface 102 of the sheet faces the food so that any food or splattering food which contacts the smooth, food-facing surface 102 can be easily removed. Optionally, the smooth, food-facing surface 102 of the sheet 100 is non-porous for easier removal of food and other contaminants. In one embodiment, the microwave sheet 100 is reusable by cleaning the sheet in a dishwasher or by hand. Alternatively, the microwave sheet 100 is disposable.

According to one exemplary embodiment, the microwave sheet 100 includes a plastic material which is substantially microwave transparent. Such plastic material is polyester, polyethylene, or similar material. The thickness or gauge of the material is sufficiently light to allow the microwave sheet to be draped over food. Additionally, the material is sufficiently heavy to prevent the microwave sheet 100 from being blown off by steam and splattering food without the sheet clinging to or being attached to the food-containing dish. In an exemplary embodiment, the material of the microwave sheet 100 has a gauge in the range of approximately 1 mil to about 12 mil.

A variety of configurations of the microwave sheet 100 permits various food-containing dishes to be adequately covered during microwave use. Appropriate configurations for the microwave sheet 100 include circular, square, rectangular, triangular, octagonal, hexagonal, and similar configurations.

Figure 2:
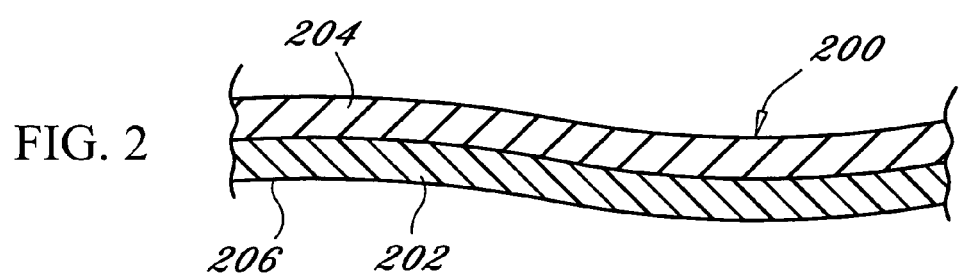
FIG. 2 is a cross-sectional view showing a microwave sheet having a plurality of layers.

FIG. 2 illustrates another exemplary embodiment of a microwave sheet 200. The microwave sheet includes two layers of material 202 and 204. The bottom layer 202 of the microwave sheet 200 includes a plastic material and has at least one substantially smooth surface 206 for contacting or facing food. The top layer 204 also includes a material that is substantially microwave transparent. For example, the top layer 204 includes a fabric material to insulate the microwave sheet 200. In another example, the top layer 204 includes a plastic, ceramic, or composite material.

Figure 3:
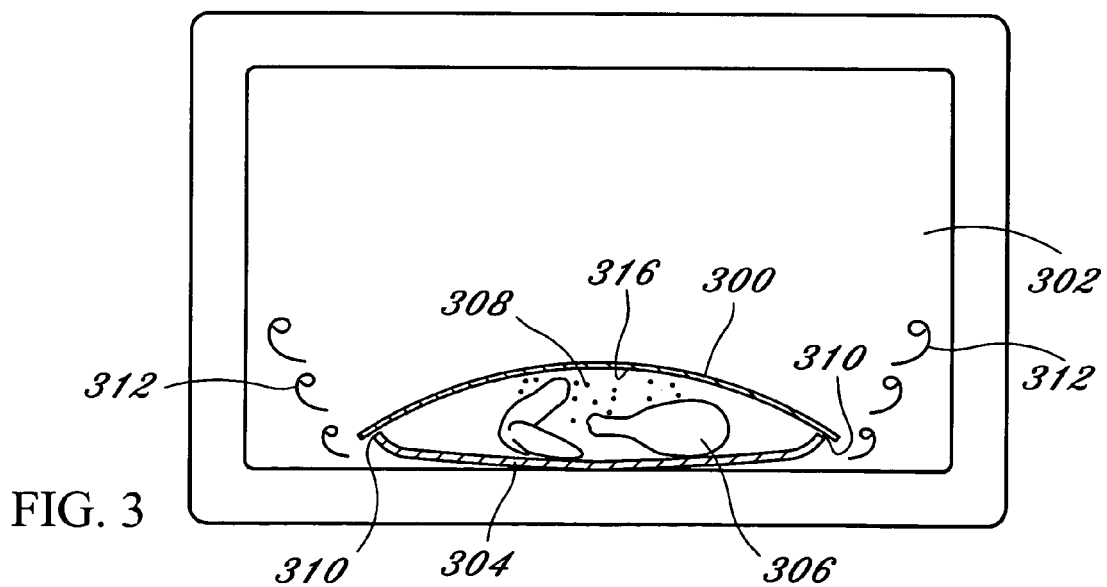
FIG. 3 is a cross-sectional view showing a microwave sheet in use within a microwave oven.

Referring to FIG. 3, an exemplary embodiment of a microwave sheet 300 is shown in use within a microwave oven 302. The microwave sheet 300 is draped over food 306 on a rigid structure, such as a plate 304. Other examples of a rigid structure include a bowl, a cup, a dish, a saucer, and other similar objects. Examples of food include liquid and solid foods. The substantially smooth surface 316 of the sheet 300 faces the food 306. When draped over food 306, the microwave sheet 300 contacts the outer edge of the plate 304 to form a partial enclosure over the food 306. The microwave sheet 300 rests on the plate 304 such that at least one passage 310 is formed between the sheet 300 and plate 304.

As the microwave 302 heats the food 306, steam 312 is produced and rises from the food 306. The steam 312 is prevented from passing through the microwave sheet 300 since the sheet 300 is free of openings. Instead, steam 312 exits from under the enclosure through at least one passage 310 formed between the microwave sheet 300 and outer edge of the plate 304. Furthermore, the microwave sheet 300 prevents splattering food 308 from soiling the interior of the microwave 302. The sufficient weight of the microwave sheet 300 prevents the sheet 300 from being blown off by the splattering food 308 and rising steam 312.

Figure 4:
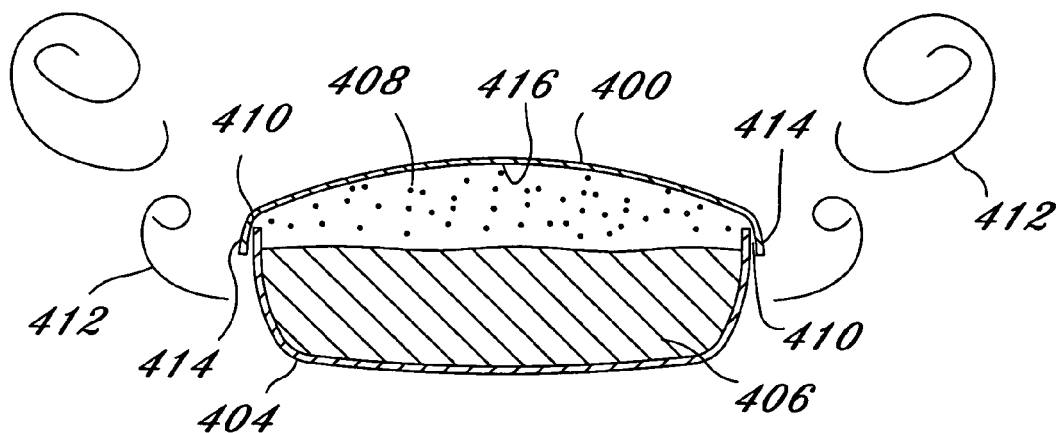
FIG. 4 is a cross-sectional view showing a microwave sheet in use having a heavier-weighted perimeter portion.

According to another exemplary embodiment, as illustrated in FIG. 4, a microwave sheet 400 of the present invention includes at least a portion of an outer perimeter 414 which is thicker or has a greater gauge than an inner portion of the sheet 400. The increased-gauge or heavier outer perimeter 414 provides additional means for holding the microwave sheet 400 in place when splattering food 408 and steam 412 are rising from the food 406 being heated in the microwave. In one embodiment, the thicker or heavier outer perimeter 414 extends around the entire microwave sheet 400.

In use, the microwave sheet 400 of FIG. 4 is draped over food 406 in a dish or bowl 404. The microwave sheet 400 rests on the edges of the bowl 404 and forms passages 410 between the sheet 400 and bowl 404. The heavier-gauged or thicker outer perimeter 414 of the microwave sheet 400 helps hold the sheet 400 over the food 406. When the food 406 is being heated by the microwave, steam 412 rises from the food 406 and escapes from under the microwave sheet 400 through the passages 410. Furthermore, splattering food 408 is caught or stopped by the smooth, food-facing surface 416 of the microwave sheet 400.

Figure 5:
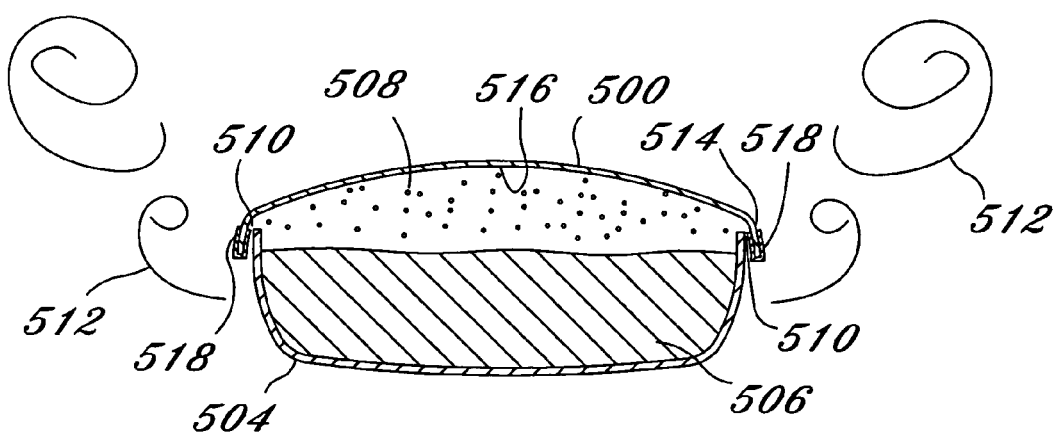
FIG. 5 is a cross-sectional view showing a microwave sheet in use having a perimeter portion with microwaveable weights.

According to another exemplary embodiment, as illustrated in FIG. 5, a microwave sheet 500 of the present invention includes at least one weight 518 on the outer perimeter 514 of the sheet 500. The at least one weight 518 provides additional means for holding the microwave sheet 500 in place when splattering food 508 and steam 512 are rising from the food 506 in the microwave. The weight 518 includes a substantially microwave transparent material, such as plastic, rubber, ceramic, composite, or similar material. In one embodiment, a plurality of weights 518 is disposed around the outer perimeter 514 of the sheet 500. For example, the plurality of weights 518 is placed generally equidistant around the outer perimeter 514.

In use, the microwave sheet 500 of FIG. 5 is draped over food 506 in a dish or bowl 504. The microwave sheet 500 rests on the edges of the bowl 504 and forms passages 510 between the sheet 500 and bowl 504. The weights 518 on the outer perimeter 514 of the microwave sheet 500 help hold the sheet 500 over the food 506. When the food 506 is being heated by the microwave, steam 512 rises from the food 506 and escapes from under the microwave sheet 500 through the passages 510. Furthermore, splattering food 508 is captured by the smooth, food-facing surface 516 of the microwave sheet 500.

Figure 6:
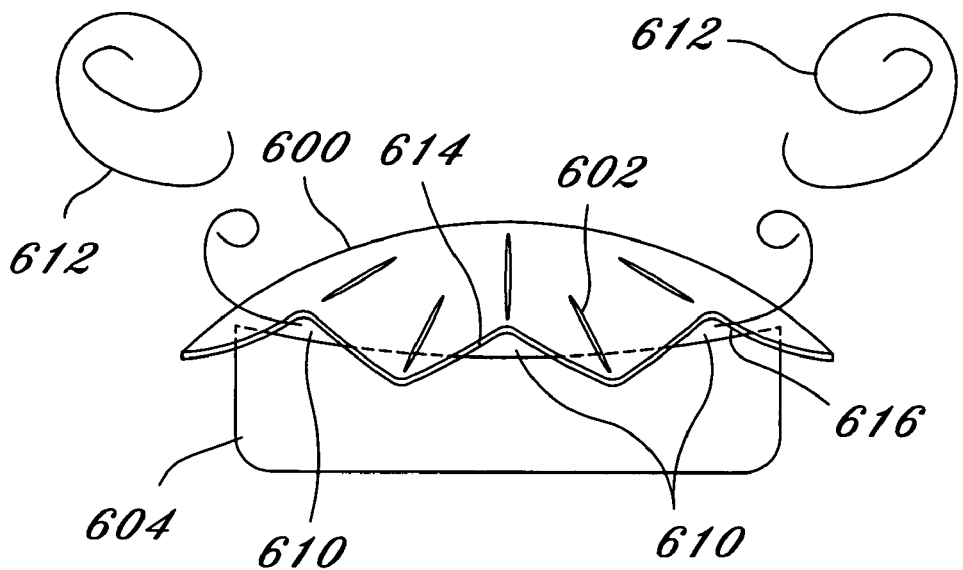
FIG. 6 is a perspective view showing a microwave sheet having a folded perimeter portion.

Referring to FIG. 6, another exemplary embodiment of the present invention is illustrated. The microwave sheet 600 includes at least one fold 602 in the outer perimeter 614 of the sheet 600. In one embodiment the fold 602 is disposed within the outer perimeter 614 during manufacturing of the sheet 600. In another embodiment, the fold 602 is placed in the outer perimeter 614 by the consumer or user of the microwave sheet 600. In an exemplary embodiment, a plurality of folds 602 is disposed in the outer perimeter 614 of the microwave sheet 600. For example, the plurality of folds 602 is spaced equidistantly around the outer perimeter 614 to form a beveled perimeter.

In use, the microwave sheet 600 of FIG. 6 is draped over food in a dish or bowl 604 and rests on the edges of the bowl 604. The folds 602 form passages 610 between the sheet 600 and bowl 604. When the food is being heated by the microwave, steam 612 rises from the food and escapes from under the microwave sheet 600 through the passages 610. Furthermore, splattering food is caught or stopped by the smooth, food-facing surface 616 of the microwave sheet 600.

Figure 7:
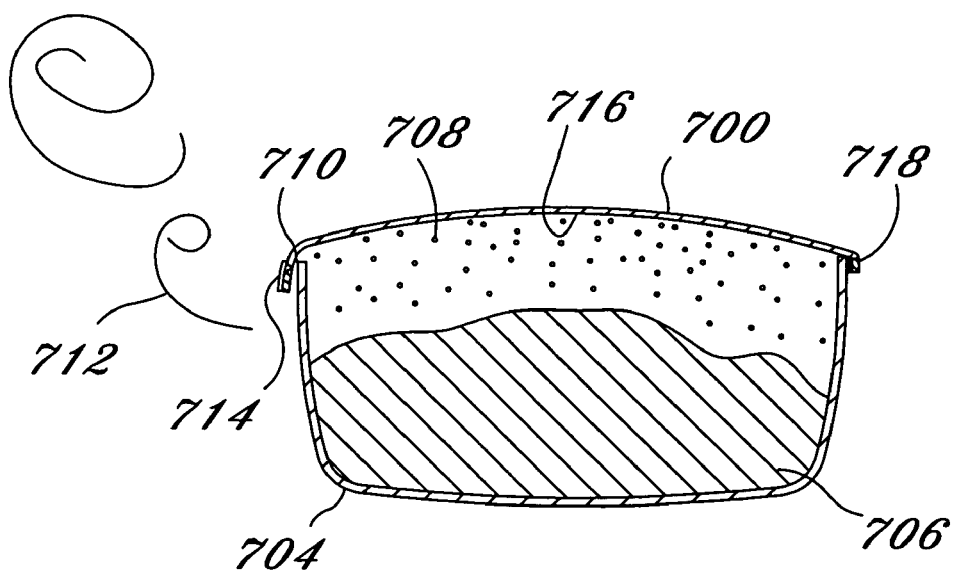
FIG. 7 is a cross-sectional view showing a microwave sheet in use having an attachment means.

According to another exemplary embodiment, as illustrated in FIG. 7, a microwave sheet 700 of the present invention includes at least one attachment means 718 for connecting the microwave sheet 700 to a plate, bowl, dish, or similar object 704. Such an attachment means 718 includes a hinge, a clip, Velcro®, adhesive, a latch, or other suitable means. In one embodiment, the microwave sheet 700 is rotationally attached to a dish 704. In another embodiment, the sheet 700 is removably connected with the dish 704.

In use, the microwave sheet 700 with an attachment means 718 as described above is placed over food 706 in a dish 704. An attachment means 718 connects one side of the microwave sheet 700 to the dish 704. As the microwave sheet 700 rests on the edge of the dish 704, a passage 710 is formed allowing steam 712 to escape from under the sheet 700. The smooth, food-facing surface 716 of the microwave sheet 700 also prevents splattering food 708 from soiling the interior of the microwave.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method for preventing the splattering of food during microwave oven cooking with a device for covering food during microwave heating, said device comprising a microwavable flexible sheet including a substantially smooth, food-facing surface that is free of openings, the sheet having a configuration including size, shape, and weight distribution for flexibly draping the sheet over food on a rigid structure such that the flexibly draped sheet overhangs and folds loosely over an outer perimeter of the rigid structure, and the sheet being sufficiently heavy to prevent the sheet from being blown off by steam from cooking food or from splattering food and without the sheet clinging to or being attached to the rigid structure during microwave heating, thereby forming at least a partial enclosure around the food when the sheet loosely contacts at least a portion of an outer perimeter of the rigid structure, and wherein during microwave heating the at least a partial enclosure around the food substantially contains food-splattering inside while allowing steam to escape through an opening formed between the flexibly draped sheet and the outer perimeter of the rigid structure, wherein the method comprises:

positioning the rigid structure containing food in a microwave oven;

draping the microwavable flexible sheet over the rigid structure with the substantially smooth opening-free surface facing the food and with the draped sheet overhanging and folding over the outer perimeter of the rigid structure thereby forming the at least a partial enclosure around the food when the sheet loosely contacts the at least a portion of the outer perimeter of the rigid structure, and without the sheet clinging to or being attached to the rigid structure during microwave heating;

forming the opening between the draped sheet and the outer perimeter of the rigid structure, the opening configured for the passage of steam; and starting the microwave oven and substantially containing food-splattering inside the at least a partial enclosure while allowing steam from the cooking food to escape from the at least a partial enclosure through the opening.

2. The method of claim 1, wherein the sheet includes plastic material.

3. The method of claim 2, wherein the sheet includes polyethylene.

4. The method of claim 3, wherein the sheet has a gauge in the range of about 1 mil to 12 mil.

5. The method of claim 1, wherein the substantially smooth, food-facing surface of the sheet is non-porous.

6. The method of claim 5, wherein the substantially smooth, food-facing surface constitutes a single layer that is free of openings.

7. The method of claim 1, wherein a gauge of a perimeter portion of the sheet is greater than a gauge of an interior portion of the sheet such that the greater gauge of the perimeter portion enhances draping of the sheet over food on the rigid structure and further enhances draping where the sheet overhangs the outer perimeter of the rigid structure.

8. The method of claim 7, wherein the perimeter portion of the sheet includes microwaveable weights to further enhance draping of the sheet.

9. The method of claim 1, wherein the sheet includes attachment means for connecting the sheet to the rigid structure.

10. The method of claim 9, wherein the sheet is rotationally attached to the rigid structure.

11. The method of claim 1, wherein the step of starting the microwave oven is performed after the opening has been formed.

12. A method for preventing the splattering of food located on a food containing dish during microwave oven cooking while covering the food on the dish with a microwavable flexible sheet made of plastic material and including a substantially smooth, food-facing surface that is free of openings, the sheet having a configuration including size, shape, and weight distribution for flexibly draping the sheet over food on the dish such that the flexibly draped sheet overhangs and folds loosely over an outer perimeter of the dish, thereby forming at least a partial enclosure around the food when the sheet loosely contacts at least a portion of an outer perimeter of the dish, the method comprising:

positioning the food containing dish in a microwave oven;

draping the microwavable flexible sheet over the dish, with the substantially smooth opening-free surface facing the food and with the draped sheet overhanging and folding over the outer perimeter of the dish thereby forming the at least a partial enclosure around the food when the sheet loosely contacts the at least a portion of the outer perimeter of the dish, and without the sheet clinging to or being attached to the dish during microwave heating;

forming an opening between the draped sheet and the outer perimeter of the rigid structure, the opening for the passage of steam from microwave cooking of the food; and microwave oven cooking the food on the dish while substantially containing food-splattering inside the at least a partial enclosure and allowing steam from the cooking food to escape from the at least a partial enclosure through the opening.

13. The method of claim 12, wherein the opening is formed such that escaping steam from the cooking food travels over an outer edge of the perimeter of the dish and is guided downward by the draped sheet overhanging, folding over, and loosely contacting, at least a portion of the outer edge of the perimeter of the dish.

* * * * *